United States Patent
Jain et al.

(10) Patent No.: US 11,573,806 B2
(45) Date of Patent: Feb. 7, 2023

(54) MANAGING PERSISTENT ENROLLMENT OF A USER DEVICE

(71) Applicant: VMware, Inc., Palo Alto, CA (US)

(72) Inventors: Rupesh Jain, Atlanta, GA (US); Kishore Krishnakumar, Atlanta, GA (US); Vijay Chari Narayan, Atlanta, GA (US); Ameya Jambavalikar, Cumming, GA (US)

(73) Assignee: VMware, Inc., Palo Alto, CA (US)

( * ) Notice: Subject to any disclaimer, the term of this patent is extended or adjusted under 35 U.S.C. 154(b) by 246 days.

(21) Appl. No.: 16/898,818

(22) Filed: Jun. 11, 2020

(65) Prior Publication Data

US 2021/0389959 A1    Dec. 16, 2021

(51) Int. Cl.
*G06F 9/4401* (2018.01)
*G06F 9/445* (2018.01)

(52) U.S. Cl.
CPC .......... *G06F 9/4451* (2013.01); *G06F 9/4401* (2013.01)

(58) Field of Classification Search
None
See application file for complete search history.

(56) References Cited

U.S. PATENT DOCUMENTS

| | | | |
|---|---|---|---|
| 10,740,109 B2 * | 8/2020 | Roszak | G06F 9/4406 |
| 10,929,147 B1 * | 2/2021 | Pell | H04L 9/0866 |
| 2016/0188307 A1 * | 6/2016 | Reagan | H04L 67/32 |
| | | | 717/177 |
| 2018/0054354 A1 * | 2/2018 | Wienstroer | G06F 8/61 |

* cited by examiner

*Primary Examiner* — Fahmida Rahman
(74) *Attorney, Agent, or Firm* — Clayton, McKay & Bailey, PC

(57) ABSTRACT

Systems and methods are included for managing persistent enrollment of a user device. The persistent enrollment can be controlled by an administrator at an administrator console. The administrator can enable or disable persistent enrollment for the user device at the admin console. A deployment agent can be provided to the user device. During the boot process, the deployment agent can verify the persistent enrollment status of the user device. The deployment agent can retrieve and install a software package for a management agent. The management agent can enroll the user device with an enterprise under a staging user profile. The management agent can install a provisioning package associated with the staging user profile. The management agent can receive user input login credentials. The management agent can change the ownership of the user device with the enterprise. The management agent can configure the user device for the user profile.

20 Claims, 8 Drawing Sheets

MANAGING PERSISTENT ENROLLMENT OF A USER DEVICE

BACKGROUND

Enterprises often provide employees with corporate-owned computing devices, such as laptops, tablets, cell phones, and personal computers. These computing devices typically require an initial setup before being given to an employee. For example, an administrator may need to install a specific operating system and applications on the device. The administrator can also take steps to enroll the computing device with a Unified Endpoint Management ("UEM") system before handing the device over to an employee. Without enrollment software installed on the computing device, the device would not be secure, and someone could install software meant to circumvent UEM management or otherwise compromise the device and any information on it. Installing the correct software, hardware, drivers, and configurations can be done as part of a device enrollment program ("DEP").

Currently, there is no way for administrators to easily enroll non-APPLE user devices or to track the device configurations. Each user device can include a different combination of hardware and software from multiple vendors. There is no central entity or repository that tracks ownership and configuration information, unlike in the APPLE ecosystem.

As a result, it can be difficult to determine which devices should be enrolled. Manually prepping each device is impractical in the scope of large enterprises. Additionally, the management features installed as part of enrollment can change over time, reducing the effectiveness of static UEM pre-installations. Further, if a device is wiped and rebooted, there are few solutions that will ensure that the device is re-enrolled in the UEM prior to launching the operating system. Likewise, if a device is decommissioned from UEM use, the device should not attempt to re-enroll or remain enrolled in the UEM system.

Further, individual device configuration is currently required. This can require user login into an OS prior to enrollment in the UEM. This gives a user opportunity to circumvent management policies, which are not yet installed in the non-enrolled device. Additionally, there is no current way for an administrator to remotely enable or disable enrollment of a device. This can allow a disgruntled ex-employee, for example, to steal corporate data from a computer before departing.

As a result, a need exists for a system for enrolling user devices for UEM operation on its initial boot based on identifying information. A need also exists for allowing an administrator to remotely enable and disable the enrollment status of user devices.

SUMMARY

Examples described herein include systems and methods for providing persistent enrollment for a user device, including automatic enrollment upon first boot-up of the device, and for remote control of the enrollment by an administrator. In one example, persistent enrollment can be enabled for a user device at an administrator console ("admin console"). The admin console can be a graphical user interface ("GUI") that an administrator can use to at least enable and disable persistent enrollment of user devices. The admin console can send the persistent enrollment enablement status to a provisioning server. The provisioning server can be a server that user devices connect to when checking their persistent enrollment status.

In an example, a deployment agent can also be loaded into the admin console. The deployment agent can be loaded in the form of a software package. An administrator can select which deployment agent applies to which user devices. This can include selecting a group of devices and choosing a deployment agent. For example, if a group of devices belongs to a tenant (for example, a first enterprise among multiple) of a UEMS, the administrator can select a deployment agent relevant to that tenant.

The admin console can provide the deployment agent to the user device. In one example, the admin console can send the deployment agent to a server of the original equipment manufacturer ("OEM") of the user device. The OEM can then load the deployment agent into the booting firmware, such as the Basic Input Output System ("BIOS"), of the user device. In another example, the admin console can push the deployment agent to the user device to be installed. In some examples, the deployment agent can inject a flag into the BIOS that causes the BIOS to reinstall the deployment agent in the event that it is deleted.

When the user device is powered on, the firmware can initialize hardware components and provide executable code for its operating system ("OS") to execute. In one example, the firmware can cause the deployment agent to execute. This can occur before the OS launches (including as part of launching the OS), in an example. When the user device has a network connection, the user device can connect to the provisioning server to request the persistent enrollment status of the user device. In one example, the provisioning server can confirm the status and send a network address to the deployment agent. The deployment agent can use the network address to download and install a management agent. The management agent can complete the enrollment process of the user device.

In an example, completing the enrollment process can include enrolling the user device with a management server of a UEMS under a staging profile. The management server can send an enrollment provisioning package. In one example, the enrollment provisioning package can include configuration settings and policies associated with the staging user profile. In some examples, the management agent can halt the OS launch process while it installs the enrollment provisioning package. After completing the installation, the management agent can allow the OS to continue loading.

In an example, the user device can receive login credentials for user input. For example, the OS can prompt a user for login credentials before granting the user access to the OS. After receiving the login credentials, the management agent can send them to the management server and change the ownership of the user device to a user profile associated with the login credentials. In one example, the management server can then provide an updated enrollment package associated with the user profile. In another example, the updated enrollment package can include various software packages for UEM-managed applications.

In some examples, an administrator can unenroll the user device, or disable persistent enrollment, from the admin console. As an example, an administrator can select to disable persistent enrollment from the admin console. The admin console send update the provisioning server and the management server with the status change. The servers can communicate with the management agent on the user device to provide instructions for disabling persistent enrollment processes, such as instructions to uninstall the deployment agent. In an example, the administrator can unenroll the user device from the admin console. The instructions can then also include instructions to uninstall the management agent.

In some examples, the administrator can select a security protocol in conjunction with disabling persistent enrollment. For example, the security protocol can include instructions to wipe all UEM-related applications and data from the user device. Alternatively, the instructions can instruct the management application to log the user out of the OS and prohibit any subsequent login that is not from an administrator. In one example, the instructions can cause the user device to perform a factory reset.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are included for managing persistent enrollment of a user device. The persistent enrollment can be controlled by an administrator at an administrator console. The administrator can enable persistent enrollment for the user device at the admin console. To do so, the administrator can select an option on a GUI that can enforce UEM enrollment for one or more devices. The administrator can also load a deployment agent into the admin console.

The deployment agent can be sent to and installed in the firmware of the user device. During the boot process, the user device can execute the deployment agent, which can verify the persistent enrollment status of the user device. The deployment agent can retrieve and install a software package for a management agent. The management agent can enroll the user device with an enterprise under a staging user profile. The management agent can receive and install an enrollment provisioning package associated with the staging user profile prior to allowing a user to log into an operating system. The management agent can then allow the user to log in. The management agent can use the login credentials to change the ownership of the user device with the enterprise. The management agent can then configure the user device for the user profile.

The deployment agent can cause the user device to set a BIOS flag indicating persistent enrollment. In an instance where the deployment agent has been removed, the flag can cause the BIOS to re-install the deployment agent from a provisioning server. This can ensure that a user device remains persistently enrolled even if the user wipes the device.

Figure 1:
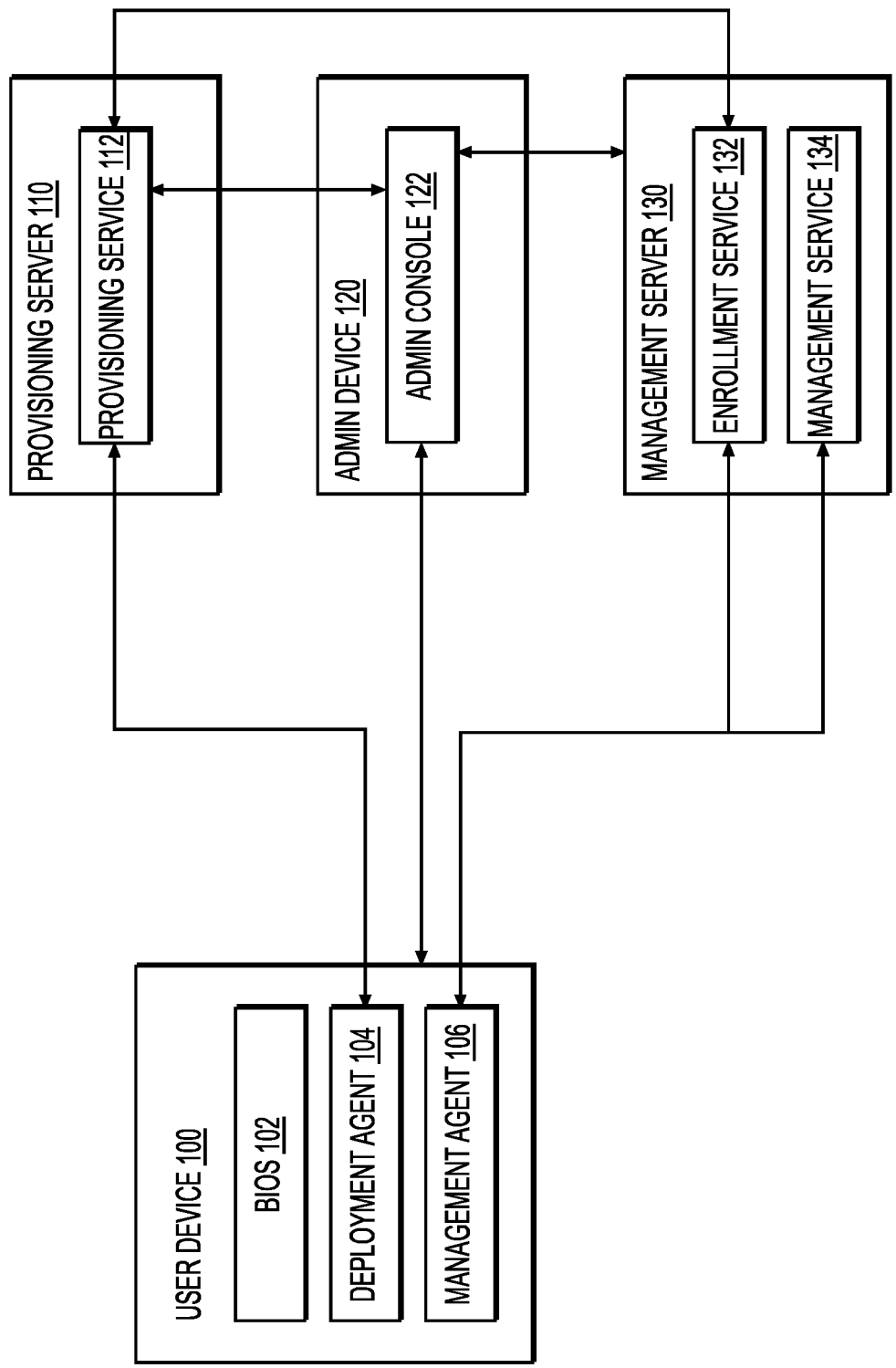
FIG. 1 is an illustration of an example system for performing persistent enrollment of a user device.

In FIG. 1, example system components for persistent enrollment are illustrated. A user device 100 can include a BIOS 102 that can be perform basic booting functions of the user device 100. The user device 100 can be one or more processor-based devices, such as a personal computer, tablet, or cell phone. When the user device 100 is powered on, it can read the BIOS 102 to initialize the boot process. This can include loading an operating system ("OS") 108. The OS 108 can exist locally and be referenced by the BIOS 102 in an example.

The user device 100 can also include a deployment agent 104. In an example, the deployment agent 104 can be responsible for some device configuration and management purposes. For example, the deployment agent 104 can reach out to a provisioning service 112 on a provisioning server 110 to check whether persistent enrollment is enabled for the user device 100. If the provisioning service 112 can confirm that persistent enrollment is enabled, the provisioning service 112 can send a download address, such as a URL, for a management agent 106 to the user device 100. The deployment agent 104 can use the download address to download and install the management agent 106 to the user device 100.

Terms like "connect to," "reach out to," "send," "receive," and "transfer" are used throughout to described communications between servers and user devices. These device-to-device communications can include various types of data file requests, such as XML or JSON files, for example.

The provisioning server 110 can be a single server or a group of servers, including multiple servers implemented virtually across multiple computing platforms. In an example, the provisioning service 112 can be responsible for storing the persistent enrollment status of user devices in a Unified Endpoint Management System ("UEMS"). Such information can be received from an administrator ("admin") console 122 on admin device 120, as an example. The provisioning service 112 can also respond to persistent enrollment status queries from user devices, such as the user device 100.

In an example where the deployment agent 104 can confirm that persistent enrollment is enabled, the deployment agent 104 can check to see if the management agent 106 is installed on the user device 100. In an example where the management agent 106 is not installed, the provisioning service 112 can send a network address, such as a Uniform Resource Locator ("URL") or other type of network address, to the user device 100. The deployment agent 104 can use the network address to download a software package of the management agent 106. In an example, the management agent 106 software package can be stored on and provided by the management server 130.

In some examples, the deployment agent 104 can verify that the management agent 106 is still installed each time the user device 100 boots. If the management agent 106 is not installed, then the deployment agent 104 can connect to the provisioning service 112 to check the persistent enrollment status of the user device 100. If the user device 100 is still opted-in, the deployment agent 104 can attempt to re-download the management agent 106. This can allow the user device 100 to remain enrolled and compliant without requiring administrator intervention, even if the management application 106 gets uninstalled or if the hard drive gets replaced.

The management agent 106 can receive and install an enrollment provisioning package provided by the management server 130. The enrollment provisioning package can include policy settings, applications, and other files required by the UEMS, as some examples. In one example, the management agent 106 can block the OS 108 from allowing a user to login, such as by pausing one or more OS processes, until enrollment, installation, and policy configuration is complete. The management agent 106 can perform various software-based steps, such as connecting to external servers and pausing ongoing processes. In some examples, the management agent 106 can operate in a parallel process to the OS 108, such that it is independent from the OS 111.

The management agent 106 can be responsible for installing applications and enrolling the user device 100 with the UEMS. As an example, the management agent 106 can connect to an enrollment service 132 on a management server 130. The management server 130 can be a server that is part of a UEMS. The management server 130 can be a single server or a group of servers, including multiple servers implemented virtually across multiple computing platforms. The management server 130 can include an enrollment service 132 and a management service 134. In some examples, the enrollment service 132 and management service 134 can be on the same management server 130 in the UEMS, but that is not required.

The policies provided can be based on ownership information associated with the user device 100. The ownership information can be stored by either the provisioning server 110 or management server 130, depending on the example. The server 110, 130 can track which user devices 100 are supplied to which tenants. A tenant can be an owner, such as a corporation. Alternatively, it can be a group or division within a corporation. Groups can be used to apply different management policies to different devices, depending on the group.

In one example, the management agent 106 can request the ownership information from the management server 130. Ownership information can be keyed on device identifiers ("device IDs"), such as serial numbers. In an example, an administrator can load ownership information into the admin console 122. The admin device 120 can send the ownership information to the provisioning server 110 and/or the management server 130. The management server 130 can use the ownership information to point the user device 100 to drivers, applications, or OS images to install, which can be located at the management server 130.

In an example, the management service 134 can control one or more managed applications on the user device 100 through interaction with the management agent 106. The management agent 106 can be an application or part of the OS 108. In one example, the management agent 106 can be installed when the user device 100 enrolls with the enrollment service 132. The management service 134 can dictate which managed applications are installed, such as based on which tenant the user device 100 belongs to. Similarly, specific functionality within the managed applications can be enabled or disabled by the management service 134.

In another example, the management server 130 can supply additional addresses for other servers where the user device 100 can retrieve drivers and applications. This can allow the management agent 106 to contact these servers over a network and install device-specific or tenant-specific applications and drivers. In one example, this can be performed prior to the management agent 106 unblocking login into the operating system 108. This can ensure that the appropriate drivers and applications are on the computing device 100 before the user can access the operating system 108. This can mitigate chances of a user circumventing management policies.

In one example, rather than downloading individual drivers and applications, these components can be downloaded as part of OS images in one example. An OS image including the management agent 106 can also be downloaded from the management server 130. A process initiated by the deployment agent 104 can assemble the OS images into a combined OS image. Then, the deployment agent 104 can reboot the computing device using the combined OS image.

The admin console 122 can be an application or interface that an administrator can use to configure persistent enrollment for user devices. The admin device 120 can be a computing device, such as a server or user device, that can provide an interface for an administrator to interact with the admin console 122. For example, the admin console 122 can allow an administrator to enable or disable user devices for persistent enrollment. The terms "enable" and "opt in" are used interchangeably throughout and can indicate a user device is authorized for persistent enrollment using the methods described herein. Likewise, the terms "disable" and "opt-out" are used interchangeably throughout and can indicate that a user device is not authorized.

The enable/disable feature can allow an administrator to remotely control enrollment of user devices in the UEMS. For example, an administrator can enter identifying information of user devices, such as a serial number, and then enable persistent enrollment for them. The admin device 120 can send this information to the servers 110, 130. The servers 110, 130 can then use the information to respond to persistent enrollment requests from user devices. In one example, to disable persistent enrollment of the user device 100, and administrator need only disable persistent enrollment for the user device 100 in the admin console 122. The admin device 120 can send the status change to the servers 110, 130. The servers 110, 130 can then instruct the user device 100 to perform certain actions to unenroll. Some examples of such instructions can include uninstalling the deployment agent 104, uninstalling the management agent 106, removing all UEMS related applications and files, and performing a device wipe.

In an example, the admin console 122 can allow an administrator to simultaneously disable persistent enrollment for groups of devices. For example, user devices can be assigned a tenant identifier ("tenant ID"). Multiple devices can be assigned the same tenant identifier to indicate that they belong to a group in the UEMS. The group can be an enterprise or different departments within an enterprise. In some examples, user devices can be assigned multiple tenant identifiers that relate to different groups the user devices belong to. In one example, an administrator can simultaneously disable persistent enrollment for groups of devices at the admin console 122 by disabling persistent enrollment for all devices associated with a particular tenant ID.

In some examples, an administrator can load a software package for the deployment agent 104 into the admin console 122. The software package can be loaded according to device details, such as which OS the device will install, in an example. The admin console 122 can then deploy the software package. In one example, the admin console 122 can send the software package to the original equipment manufacturers ("OEM") the user device 100. The OEM can install the deployment agent 104 during a staging process before sending it to the user.

In another example, the admin console 122 can push the software package to the user device 100. For example, the user device 100 can already be enrolled with the UEMS. Because the user device 100 is already enrolled, it can already have the management agent 106 installed. However, without the deployment agent 104, the user device 100 may not be capable of persistent enrollment. For example, management agent 106 can be installed as an application within the OS 108. If the OS 108 is reinstalled, such as if the hard drive of the user device 100 is replaced as an example, then the user device 100 will not have the ability to reconfigure itself and re-enroll with the UEMS because the functionality is not built into the BIOS 102. However, in an example, the admin console 122 can communicate with the user device, or more specifically the management agent 106, to push the software package of the deployment agent 104 to the user device 100. The user device 100 can then install the deployment agent 104 so that the user device 100 can be configured for persistent enrollment.

In an example, an administrator can use the admin console 122 to configure one or multiple devices for persistent enrollment. The administrator can do this by entering identifying information of user devices, such as a serial number, into the admin console 122 and selecting to enable persistent enrollment for the user devices. The admin server 120 can then send the identifying information and persistent enrollment status to the servers 110, 130. The servers 110, 130 can then use the identifying information and persistent enrollment status when responding to requests from user devices. This can include selecting the appropriate deployment agent 104 for sending to a respective user device based on that device's OS.

Figure 2:
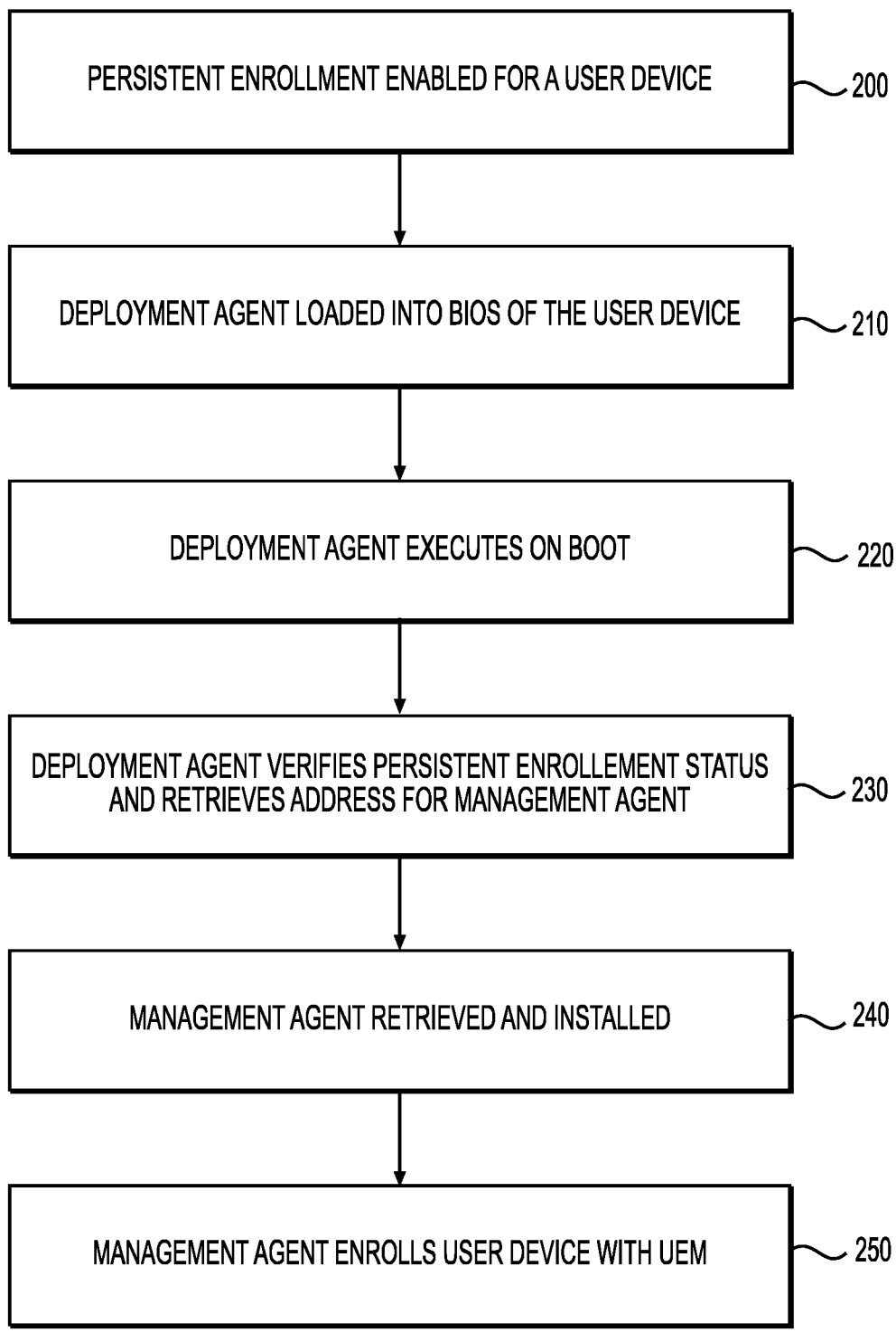
FIG. 2 is a flowchart of an example method for persistent enrollment of a user device.

Turning to FIG. 2, example stages for enabling and configuring a user device for persistent enrollment are shown. At stage 200, persistent enrollment for the user device 100 can be enabled. In an example, this can be done by an administrator at the admin console 122. For example, an administrator can enter a device ID for the user device 100 into the admin console 122. The device ID can be an identifier that uniquely identifies the user device 100. For example, the device ID can be a combination of a serial and model number, or for a mobile device the device ID can be the device's International Mobile Equipment Identity ("IMEI") number. Some OEMs use their own identification system that can be used to identify a device. For example, DELL assigns a unique number called a "service tag" to all devices it produces. In an example, the administrator can use such an OEM-specific unique identifier. The administrator can also enable persistent enrollment for the user device 100 from the admin console 122.

In another example, device identifiers are associated with groups, such as tenants within the UEM. The administrator can select an entire group and enable or disable persistent enrollment for that group. This can cause the persistent enrollment setting to change for all of the user devices in that group.

At stage 210, the deployment agent 104 can be loaded into the BIOS 102 of the user device 100. In one example, this can be done by the OEM during staging of the user device 100. For example, an administrator can load a software package for the deployment agent 104 into the admin device 120 using the admin console 122. The admin device 120 can send the software package as a data file, for example, to a server for the OEM of the user device 120. The OEM can load the deployment agent 104 into the BIOS 102 of the user device 100 before sending the user device 100 to a user.

In another example, the admin server 120 can push the software package to the user device 100. In this example, the user device 100 may already be enrolled with the UEM and have the management agent 106 installed. The admin server 120 can provided instructions to the management agent 106 to download and install the deployment agent 104 into the BIOS 102. For example, the admin server 120 can send a download link, such as a URL, that the management agent 106 can use to retrieve the software package.

At stage 220, the user device 100 can boot and execute the deployment agent 104. In an example, the BIOS 102 can initialize when the user device 100 powers on or restarts. A flag in the BIOS 102 can it to execute the deployment agent 104. This can occur on first boot and on subsequent boots.

At stage 230, the deployment agent 104 can verify the persistent enrollment status of the user device 100. In an example, the deployment agent 104 can wait for network access and then contact the provisioning server 110. For example, the deployment agent 104 can be preconfigured with a network address of provisioning server, and, once the user device 100 has network access, the deployment agent 104 can connect to the provisioning server 110 using the network address. Once connected, the deployment agent 104 can send the device ID of the user device 100 to the provisioning server 110.

The provisioning service 112 can use the device ID to determine whether the user device 100 is opted in for persistent enrollment. For example, the provisioning service 112 can store the details of user devices that is receives from the admin console 122, including their persistent enrollment enablement status. The details can be stored on the provisioning server 110 or on another device, such as a database storage server. The device details can be stored in relational data tables, in an example. Using these details, the provisioning service 112 can check the persistent enrollment enablement status of the user device 100.

The provisioning service 112 can reply to the deployment agent 104 with the persistent enrollment enablement status of the user device 100. The provisioning service 112 can also provide an address for downloading a software package for the management agent 106. For example, the provisioning service 112 can send a download link, such as a URL, that the deployment agent 104 can use to retrieve the management agent software package. In one example, the management agent software package can be stored at the management server 130, and the address can be a network address for the management server 130.

At stage 240, the deployment agent 104 can retrieve and install the management agent 106. As an example, the deployment agent 104 can use the network address provided at stage 230 to download the software package for the management agent 106. The deployment agent 104 can then install the management agent 104. Installing the management agent 104 can include injecting it into the OS 108. As an example, the deployment agent 104 can access an OS 108 API.

Figure 3:
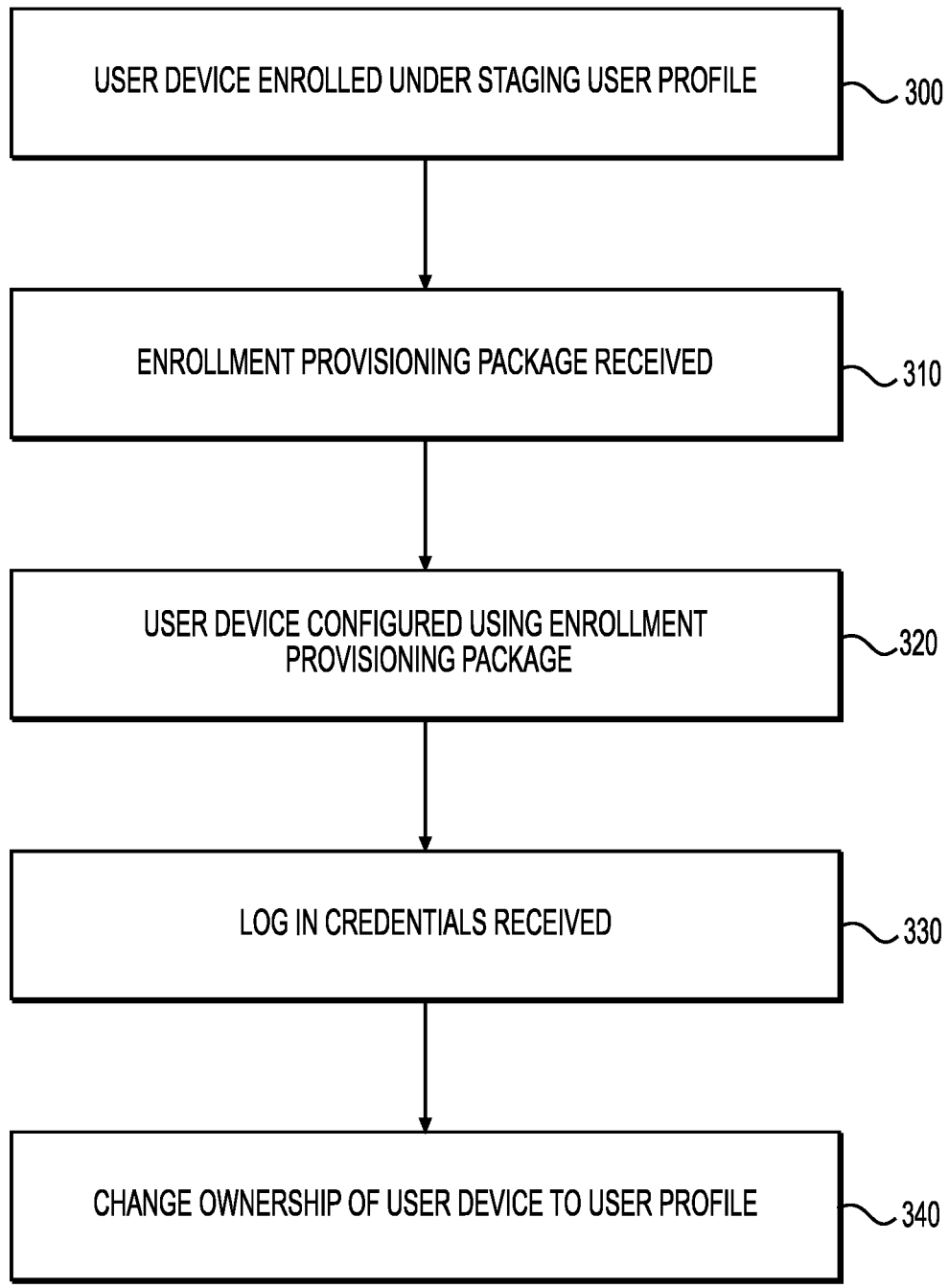
FIG. 3 is another flowchart of an example method for persistent enrollment of a user device.

At stage 250, the management agent 106 can enroll the user device 100 with the UEMS. FIG. 3 illustrates examples stages for enrolling a user device that is opted in for persistent enrollment. At stage 300, the management agent 106 can enroll the user device 100 under a staging profile. Enrolling under a staging profile can allow the management agent 106 to receive and implement appropriate management policies on the user device 100 before a user gains access to the OS 108. For example, the management server 130 can store management policies for each user profile. The policies provided can be based on ownership information associated with the user device 100. The policies can affect which data, applications, and other UEMS resources that a user device can access. In an example, the staging user profile can be a user profile that only allows a user device to access configuration and policy settings that must be implemented. By enrolling first under a staging user profile, the management agent 106 can properly configure and secure the user device 100 before granting a user access to the OS 108.

In some examples, the staging profile can be configured at the admin console 122. For example, an administrator can update configuration and policy settings for new user devices at the admin console 122. The admin console 122 can send any updates to the enrollment service 132. When a new user device enrolls under a staging user profile, enrollment service 132 can provide the updated settings. This can help streamline the persistent enrollment process, eliminating the need to manually reconfigure each device when an update is needed.

At stage 310, the management agent 106 can receive an enrollment provisioning package ("PPKG"). In an example, the PPKG can be a .ppkg file that includes a collection of configuration settings. The PPKG can be a received from the enrollment service 132, for example. The PPKG can include configurations settings associated with the staging user profile, as explained above.

At stage 320, the management agent 106 can configure the user device 100 using the PPKG. For example, the management agent 106 can implement appropriate management policies from the PPKG on the user device 100. The management agent 106 can also configure the user device 100 prior to the OS 108 fully loading. As an example, the management agent 106 can pause loading of the OS 108 to allow for these processes to complete before allowing the user to login to the OS 108. For example, during enrollment, the management agent 106 can pause one or more binaries that execute as part of the OS 108 startup. Multiple binaries must complete in sequence for the OS 108 to load successfully. By pausing one or more of them, the user will not be presented with a login screen. After management policies are in place, the management agent 106 can un-block the login process.

At stage 330, the user device 100 can receive login credentials. For example, the OS 108 can display a login prompt and receive login credentials from user input. In one example, the OS 108 can present a series of screens designed to collect user information for completing enrollment at the management server 130. The management agent 106 can collect user inputs (such as login information) and send those inputs to the enrollment service 132 at stage 340. The enrollment service 132 can then change the ownership of the user device 100 from the staging profile to a user profile associated with the login credentials. In an example where the user profile does not yet exist in the UEMS, a profile can be created by the enrollment agent 132.

Figure 4:
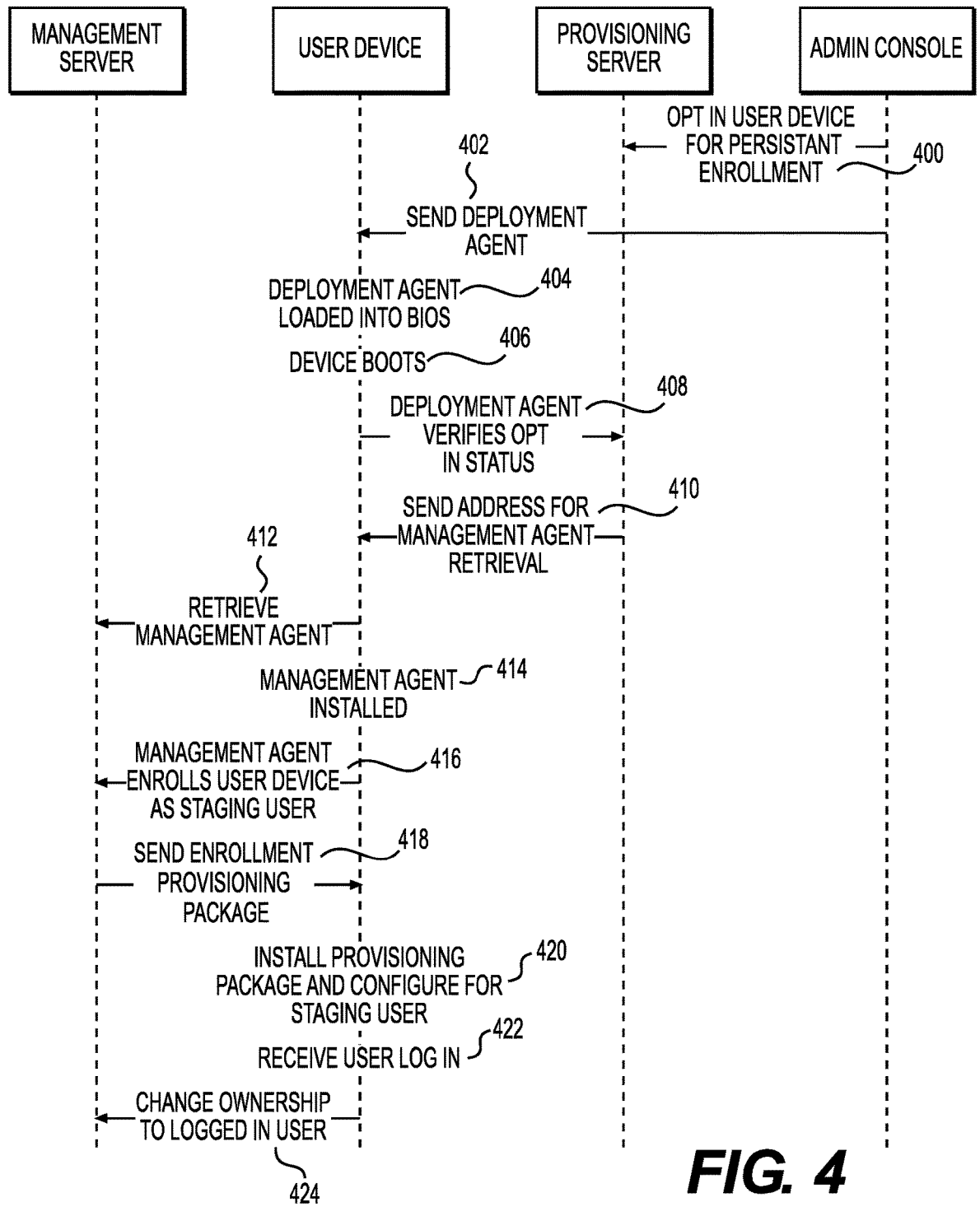
FIG. 4 is a sequence diagram of an example method for persistent enrollment of a user device.

FIG. 4 is a sequence diagram of an example method for persistent enrollment of a user device. At stage 400, the admin console 122 can opt in the user device 100 for persistent enrollment. For example, an administrator can opt in the user device 100 using the admin console 122, and the admin device 120 can send opt in detail to the provisioning service 112. In one example, the opt in detail can include a device ID for the user device 100. For example, the administrator can enter the device ID into the admin console when the user device 100 is to be enrolled for the first time.

At stage 402, the admin console 122 can send the deployment agent 104 to the user device 100. In an example, the admin device 120 can push a software package for the deployment agent 104 to the user device 100. This can occur in examples where the user device 100 is already enrolled with the UEMS but may not be configured for persistent enrollment. The admin device 120 can communicate with the management agent 106 already installed on the user device 100 to handle sending the deployment agent. The management agent 106 can then handle loading the installing the deployment agent 104 and loading it into the BIOS 102 at stage 404.

In another example, the admin device 120 can send the deployment agent 104 to the OEM of the user device 100, such as a server of the OEM, and at stage 404 the OEM can install the deployment agent 104 on the user device 100 before sending it to a user. In still another example, an administrator can receive the user device 100 from the OEM and install the deployment agent 104 before sending it to the user.

At stage 406, the user device 100 can boot. Booting can occur when the user device 100 powers on or restarts, for example. Powering on or restarting the device can cause the user device 100 to initialize the BIOS 102 firmware. The BIOS 102 can include a flag that causes the user device 100 to also initialize the deployment agent 104. In one example, the flag can be inserted into the BIOS 102 can the deployment agent 104 is installed.

At stage 408, the deployment agent 104 can verify the opt in status of the user device 100 with the provisioning service 112. In an example, the deployment agent 104 can wait for network access and then contact the provisioning server 110. For example, the deployment agent 104 can be preconfigured with a network address of provisioning server, and, once the user device 100 has network access, the deployment agent 104 can connect to the provisioning server 110 using the network address. Once connected, the deployment agent 104 can send the device ID of the user device 100 to the provisioning server 110.

The provisioning service 112 can use the device ID to determine whether the user device 100 is opted in for persistent enrollment. For example, the provisioning service 112 can compare the device ID provided by the user device 100 to the opt in details provided by the admin console 122 to verify the opt in status of the user device 100. After verifying the user device's 100 opt in status, at stage 410 the provisioning service 112 can send an address for retrieving a software package of the management agent 106. In an example, address can be a download link, such as a URL, that the deployment agent 104 can use to retrieve the management agent software package. In one example, the management agent software package can be stored at the management server 130.

At stage 412, the deployment agent 104 can retrieve the management agent software package using the address provided at stage 410. In an example, the management agent software package can be provided by the management server 130. At stage 414, the deployment agent 104 can install the management agent 106 on the user device 100. Installing the management agent 104 can include injecting it into the OS 108. As an example, the deployment agent 104 can access an OS 108 API.

At stage 416, the management agent 106 can enroll the user device 100 with the enrollment service 132 under a staging user profile. In an example, this can be done before a user has logged into the OS 108. For example, the management agent 106 can pause loading of the OS 108 to allow for the enrollment process to complete before allowing the user to login to the OS 108.

At stage 418, the management server 130 can send a PPKG to the user device 100. In an example, the PPKG can be a .ppkg file that includes a collection of configuration settings. The configuration settings in the PPKG can be associated with the staging user profile. In an example, configuration settings in the PPKG can make the user device 100 compliant with management policies, but not allow access to UEMS resources.

At stage 420, the management agent 106 can install the PPKG. Installing the PPKG can include implementing the management policies and other required settings. In an example, once the management agent installs the PPKG, the management agent 106 can allow the OS 108 to continue loading. In one example, the new configuration settings can cause the OS 108 to initiate an enrollment wizard whereby the OS 108 presents a series of screens designed to collect user information for completing enrollment at the management server 130.

At stage 422, the user device 100 can receive user input login information. For example, the OS 108 can prompt a user to enter a username and password or other login information. Then, at stage 424, the management agent 106 can communicate with the enrollment agent 132 to change the ownership of the user device 100 to a user profile associated with the login information. In one example, changing ownership of the user device 100 can cause the management server 130 to send new policies and configuration settings associated with the user profile. In some examples, the management agent 106 can again pause loading of the OS 108 until the new policies and settings are installed. In another example, the management server 130 can also send one or more software packages for managed applications associated with the user profile.

Figure 5:
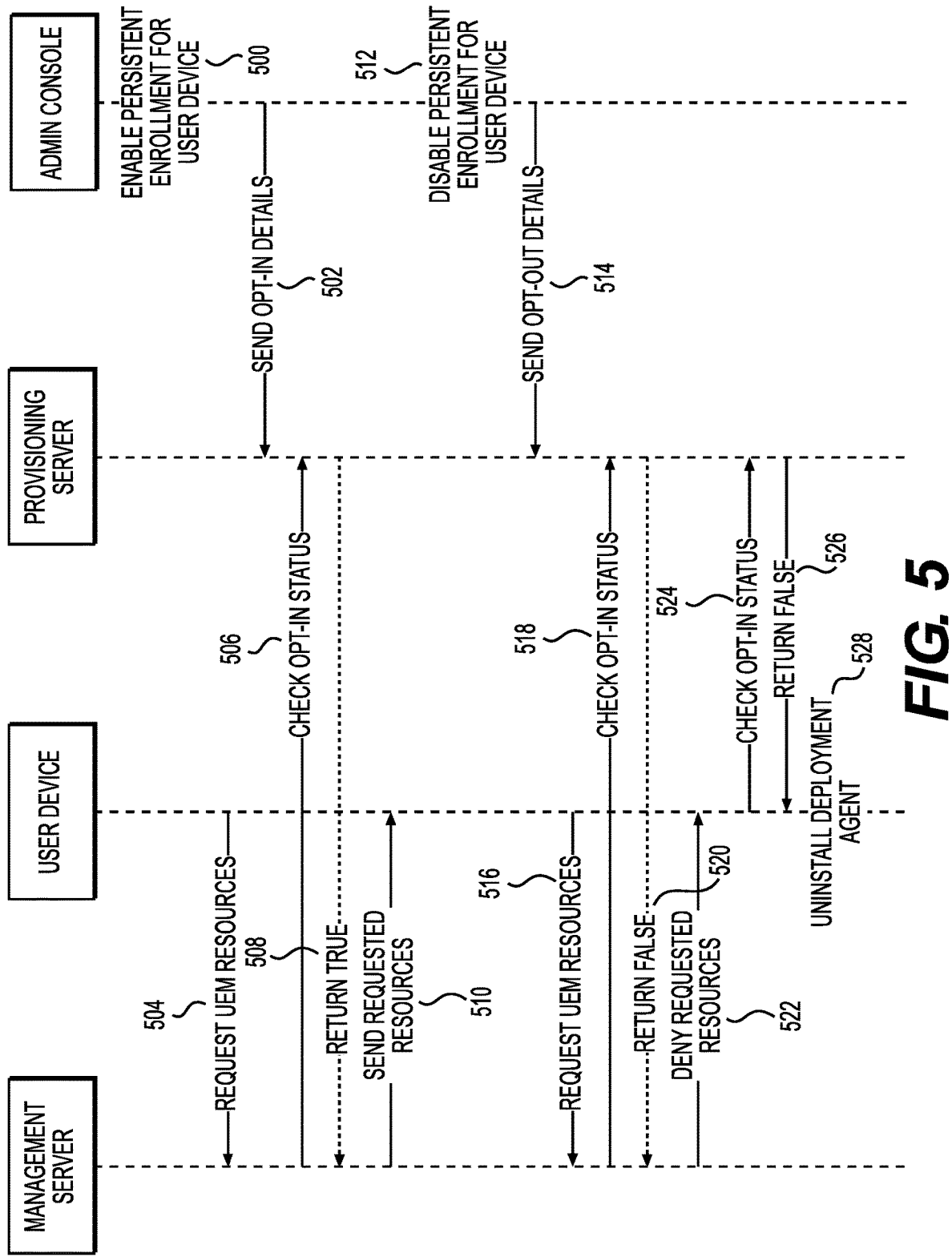
FIG. 5 is a sequence diagram of an example method for enabling and disabling persistent enrollment of a user device

FIG. 5 is a sequence diagram of an example method for enabling and disabling persistent enrollment of the user device 100 from an admin console 122. At stage 500, an administrator can enable persistent enrollment for the user device 100 at the admin console 122. In an example, the administrator can do this using an interface on the admin device 120. Persistent enrollment can be enabled for the user device 100 regardless of whether the user device 100 is enrolled or not with the UEMS.

At stage 502, the admin console 122 can send the enablement/opt in details to the provisioning server 110. In one example, the opt in details can include a device ID of the user device 100 and an indicator that the user device 100 is opted in for persistent enrollment. In some examples, the admin console 122 can also send the opt in details to the management server 130.

At stage 504, the user device 100 can request UEM resources from the management server 130. Some examples of a UEM resource request can include a login attempt, data file request, and a new email query. At stage 506, the management server 130 can check the opt in status of the user device 100. In an example where the admin console 122 sent the opt in details to the management server 130, the management server 130 can check the opt in status using that information. In another example, the management server 130 can request the opt in status from the provisioning server 110. At stage 508, the provisioning server 110 can reply confirming that the user device 100 is opted in for persistent enrollment. Upon confirming that the user device 100 is opted in, at stage 510 the management server can send the requested resources to the user device 100.

At stage 512, the administrator can disable persistent enrollment for the user device 100 at the admin console 122. Then, at stage 514, the admin device 120 can send the opt-out details to the provisioning server 110. In some examples, the admin device 120 can also send the opt-out details to the management server 130. Like stages 504 and 506 above, at stages 516 and 518 the user device 100 can request UEM resources from the management server 130, and the management server 130 can check the opt in status of the user device 100. In one example, the management server 130 can use the opt-out details provided by the admin device 120. In an example where the opt-out details are not provided by the admin device 120, the management server 130 can request the opt in status from the provisioning server 110. At stage 520 the provisioning server 110 can indicate to the management server 130 that the user device 100 is not opted in. In response, at stage 522 the management server 130 can deny the user device's 100 request for UEM resources.

In one example, at stage 524 the user device 100 can request the opt in status from the provisioning server 110. The provisioning server 110 can respond at stage 526 that the user device 100 is opted out. In one example, the response can also include instructions for the management agent 106 to execute. Some examples of such instructions can include uninstalling the deployment agent 104 at stage 528, uninstalling the management agent 106, wiping all UEM data files and applications from the user device 100, and any combination of these. In some examples the opt-out status and instructions can be provided by the management server 130.

The example method described above illustrates how an administrator can remotely enable and disable persistent enrollment of a user device. An administrator can make such changes without interacting with the user device at all. The change can take effect without the user device 100 being able to access any further UEM resources.

Figure 6:
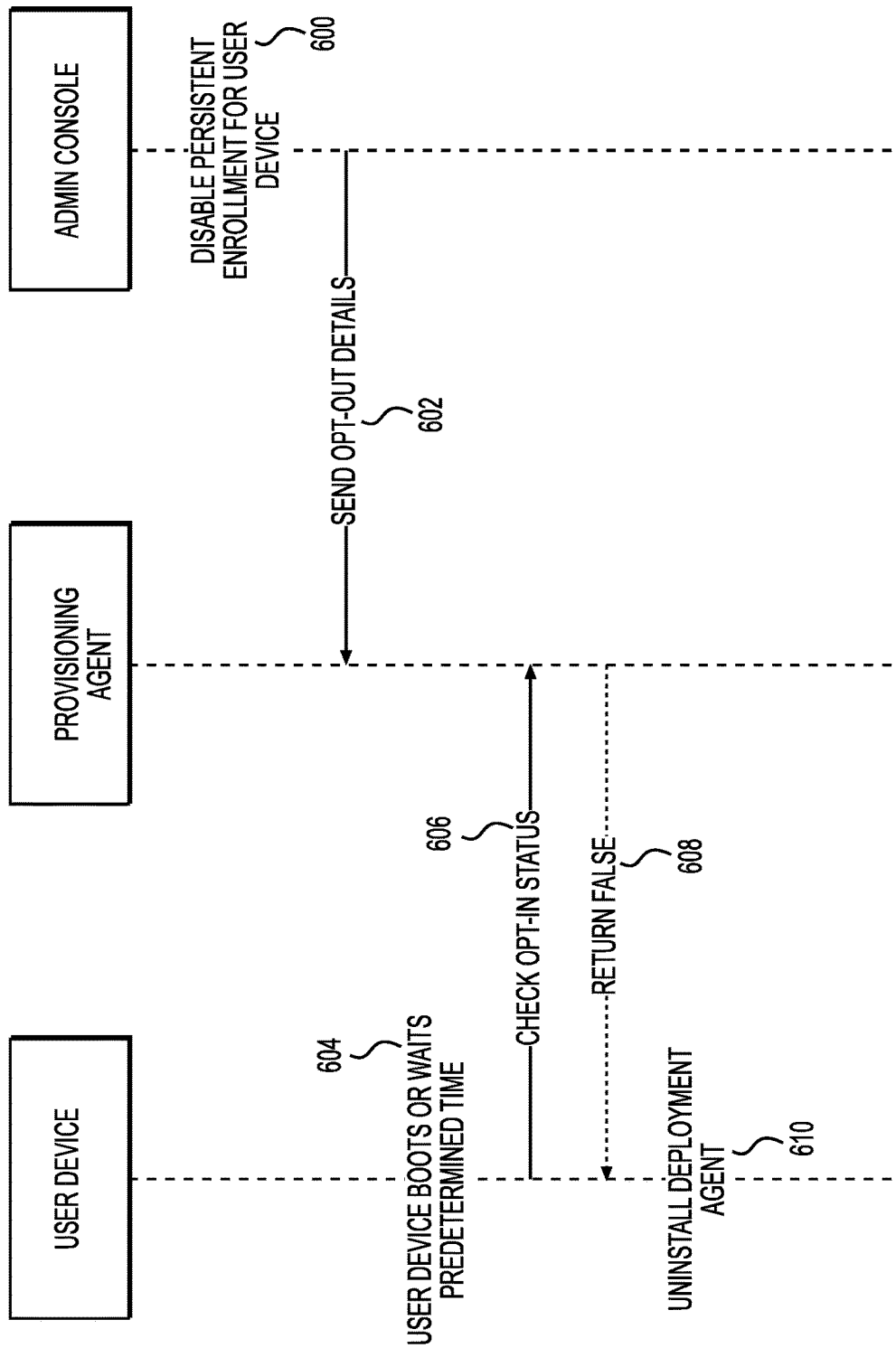
FIG. 6 is a sequence diagram of an example method for disabling persistent enrollment of a user device.

FIG. 6 is a sequence diagram of an example method for disabling persistent enrollment of the user device 100 from an admin console 122. At stage 600, an administrator can disable persistent enrollment for the user device 100 at the admin console 122. At stage 602, the admin device 120 can send the opt-out details to the provisioning agent 112. At stage 604, the user device 100 can boot or restart. As part of the boot sequence, at stage 606 the deployment agent 104 can request the opt-in status of the user device 100 from the provisioning agent 112. In some examples, the deployment agent 104, the management agent 106, or both can be configured to request the opt-in status of the user device 100 at regular intervals. For example, the opt-in status can be checked every 6 or 12 hours.

At stage 608, the provisioning agent 112 can respond to the user device 100 that it is not opt-in. In some examples, the response can also include instructions for the user device 100 to carry out as a result of the persistent enrollment status change. At stage 610, the user device 100 can uninstall the deployment agent 104. In an example, the user device 100 can also remove any changes that the deployment agent 104 made to the BIOS 102, such as a flag to request the deployment agent 104 from the provisioning server 110.

Figure 7:
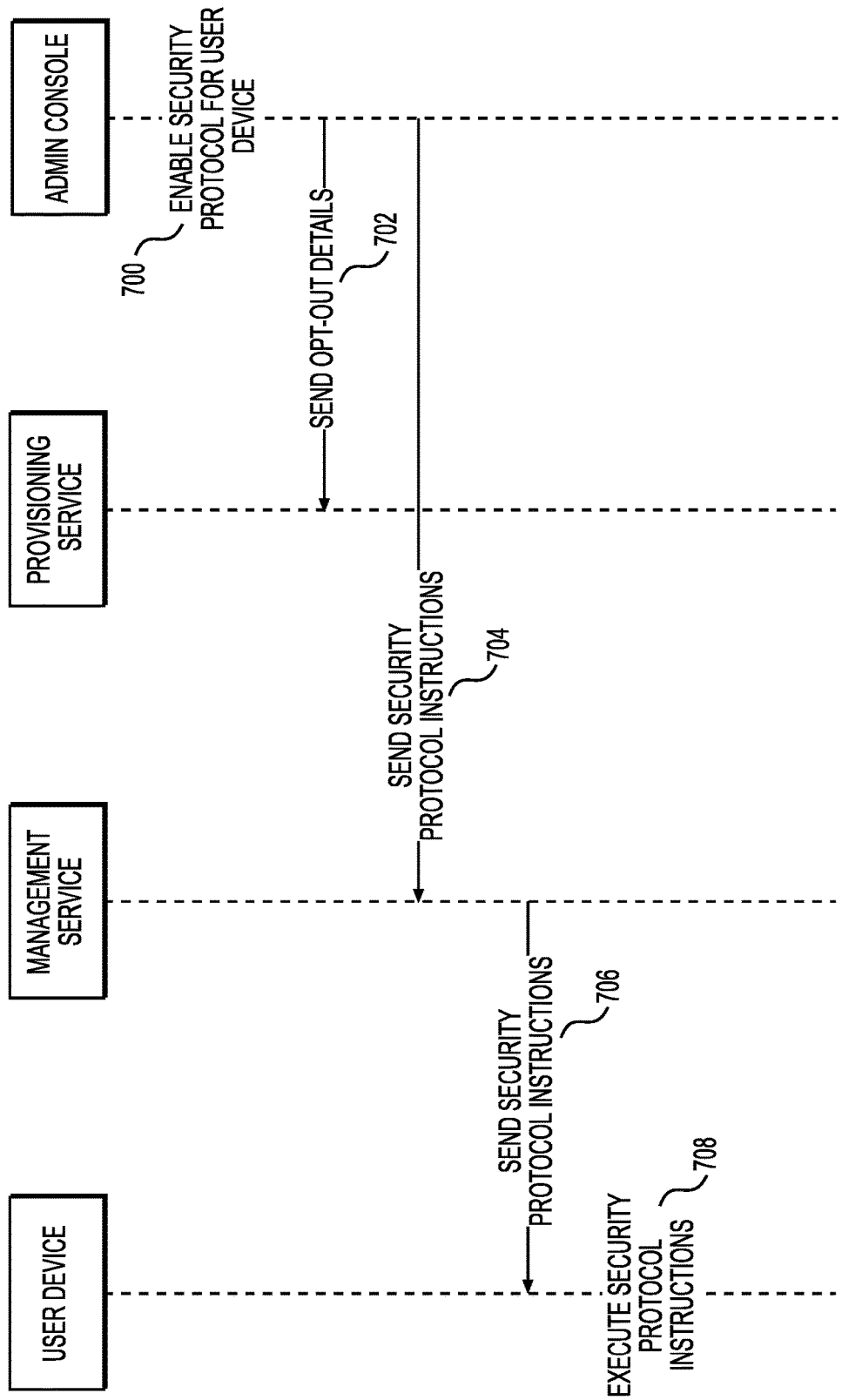
FIG. 7 is a sequence diagram of an example method for remotely unenrolling a user device that has persistent enrollment enabled.

FIG. 7 is a sequence diagram of an example method for disabling persistent enrollment of the user device 100 from an admin console 122 and enacting a security protocol. At stage 700, an administrator can enable a security protocol for the user device 100 at the admin console 122. For example, when an administrator opts out a user device at the admin console 122, the administrator can select other options related to the opt-out. The options selected by the administrator can dictate the instructions that are included in the security protocol. In one example, the administrator can disable persistent enrollment, but allow the user device 100 to remain enrolled in the UEMS. This can result in the admin device 120 sending instructions to the enrollment service 112 for the user device 100 to uninstall the deployment agent 104. In another example, the administrator can unenroll the user device 100 completely from the UEMS. This can result in the admin device 120 sending instructions to the enrollment service 112 for the user device 100 to uninstall the deployment agent 104 and the management agent 106. In some examples, the administrator can also select to have the user device 100 execute a device wipe.

At stage 702, the admin device 120 can send opt-out details to the provisioning service 112. In an example, the opt-out details can also include the security protocol instructions. This can help ensure that, if the user device 100 is turned off when the administrator opts it out, the provisioning service 112 can send the security protocol instructions to the user device 100 when it powers on.

At stage 704, the admin console can send the security protocol instructions to the management service 134. The management service 134 can in turn send the security protocol instructions to the user device 100 at stage 706. In one example, the management service 134 can send the security protocol instructions to the user device 100 in response to an opt-in status request or a request for UEM resources. In another example, the management service 134 can push the security protocol instructions to the management agent 106.

At stage 708, the management agent 106 can execute the security protocol instructions. In one example, this can include uninstalling the deployment agent 104. In another example, this can include uninstalling the management agent 106. In still another example, this can include executing a device wipe of at least all UEM-related data files and applications.

Figure 8:
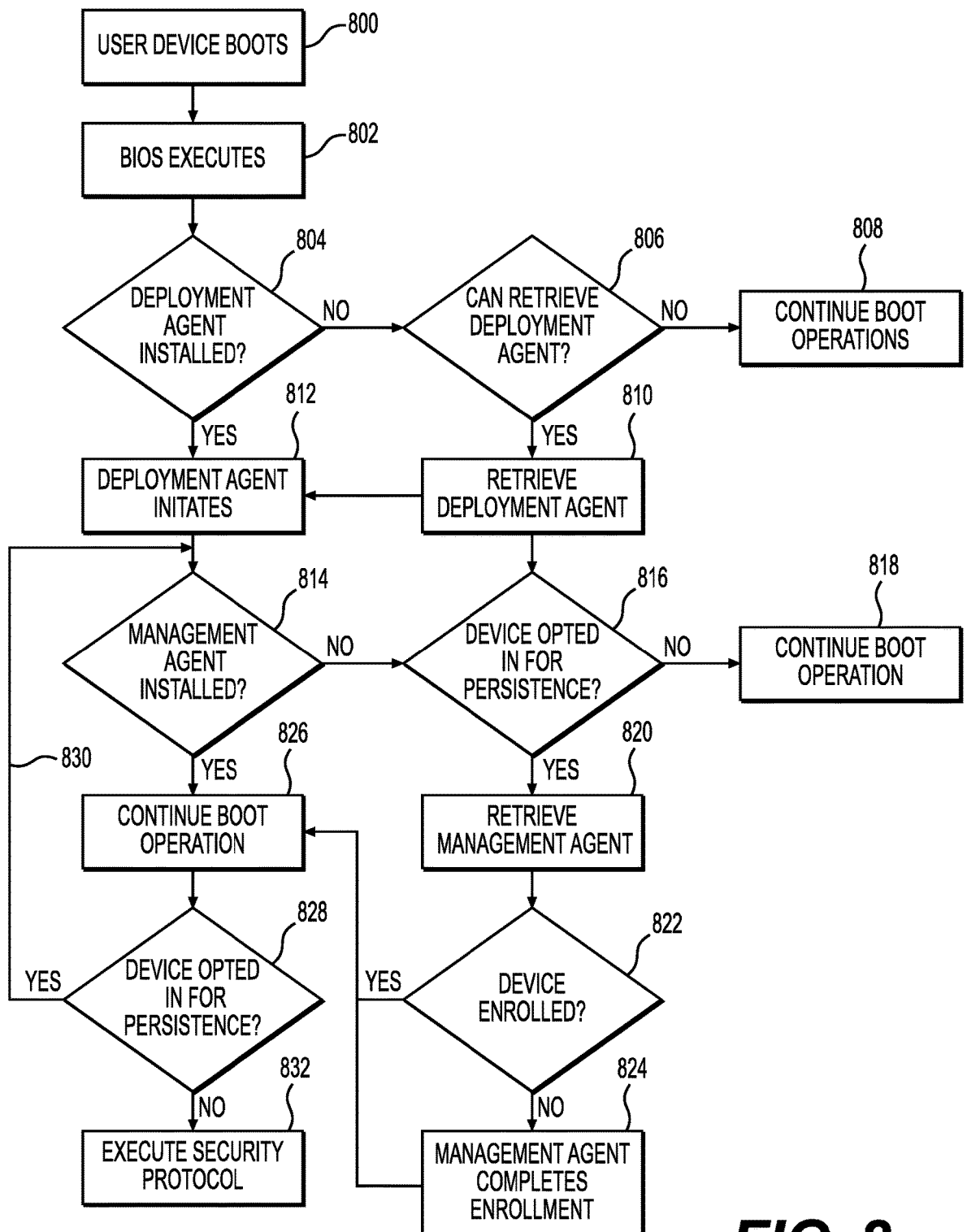
FIG. 8 is a flowchart of an example method of a boot sequence of a user device configured for persistent enrollment.

FIG. 8 is a flowchart of an example method for a boot sequence of the user device 100 for persistent enrollment. At stage 800, the user device 100 can boot. This can occur as a result of the user device 100 powering on or restarting, as a few examples. At stage 802, the user device 100 can initialize the BIOS 102 firmware. At stage 804, if the deployment agent 104 is installed, the method moves to stage 812 where the deployment agent 104 initiates. However, if the deployment agent 104 is not installed, the method can move to stage 806. If the deployment agent 104 can be retrieved, at stage 810 the user device retrieves and installs it. An example where this can occur is where the deployment agent 104 was previously installed and inserted a flag into the BIOS to look for the deployment agent 104. If, for example, the hard drive of the user device 100 gets replaced or wiped, the BIOS can still retrieve the deployment agent 104 so that the user device 100 can be reconfigured and remain compliant with UEMS policies. If the BIOS 102 cannot retrieve the deployment agent 104, then at stage 808 the user device 100 can load the OS 108. However, in some examples, because the deployment agent 104 is not installed and cannot be retrieved, the OS 108 may load in a secure mode that restricts access to UEM applications and data files.

Once the deployment agent 104 initiates at stage 812, it can determine whether the management agent 106 is installed at stage 814. If the management agent 106 is installed, the method moves to stage 826 where the user device 100 can continue boot operations. For example, the user device 100 can begin loading the OS 108. If the management agent 106 is not installed, then at stage 816 the deployment agent 104 can connect to the provisioning server 110 to determine if the user device 100 is opted in for persistent enrollment. If the provisioning server 110 responds that the user device 100 is not opted in, or if the deployment agent 104 cannot connect to the provisioning server 110, then at stage 818 the user device 100 can continue boot operations. However, in some examples, because the management agent 106 is not installed and cannot be retrieved, the OS 108 may load in a secure mode that restricts access to UEM applications and data files.

If the provisioning server 110 responds indicating that the user device 100 is opted in, then at stage 820 the deployment agent 104 can retrieve and install the management agent 106. Once installed, at stage 822 the management agent 106 can connect to the management server 130 to determine whether the user device 100 is enrolled with the UEMS. If so, the method can continue to stage 826 where the user device 100 continues boot operations. If not, the method can proceed to stage 824 where the management agent 106 completes enrollment with the management server 130 before continuing to stage 826 for continued boot operations.

At stage 828, the user device 100, by the deployment agent 104, the management agent 106, or both, can again check the opt-in status of the user device 100. In an example, the agents 104, 106 can be configured to request the opt-in status from the servers 110, 130 at regular intervals. In another example, the agents 104, 106 can request the opt-in status from the servers 110, 130 when the user device 100 next boots. Where the device is still opted in, at stage 830 the user device 100 can return to stage 814 where it again determines if the management agent 106. If the user device 100 is opted out of persistent enrollment, then at stage 832 the user device 100 can execute a security protocol. In one example, this can include uninstalling the deployment agent 104. In another example, this can include uninstalling the management agent 106. In still another example, this can include executing a device wipe of at least all UEM-related data files and applications.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for persistent enterprise device enrollment, comprising:
    verifying, by a deployment agent installed in a booting firmware of a user device, that persistent enrollment is enabled for the user device during a booting process of the user device;
    pausing the booting process for an operating system ("OS") loading on the user device;
    receiving an address for an enrollment provisioning package;
    retrieving, using the address, the enrollment provisioning package, the enrollment provisioning package including a software package for a management agent; and
    installing the management agent on the user device, whereupon the management agent completes enrollment of the user device with a Unified Endpoint Management System ("UEMS") by performing stages comprising:
        configuring the user device using a staging user profile included the enrollment provisioning package;
        in response to the configuring being completed, resuming the booting process to provide a user login prompt;
        receiving user login credentials via the user login prompt;
        retrieving, using the user login credentials, a user profile associated with the user login credentials; and
        configuring the user device using policies and configuration settings included in the user profile.

2. The method of claim 1, wherein the deployment agent verifying that persistent enrollment is enabled for the user device comprises providing, to an enrollment server, a hardware identifier associated with the user device and a user identifier associated with the staging user profile, the hardware identifier and the user identifier being previously provided to the enrollment server by an administrator console.

3. The method of claim 1, wherein the management agent completing enrollment of the user device with the UEMS comprises
    changing ownership of the user device with the UEMS to a user profile associated with the log in credentials.

4. The method of claim 1, the stages further comprising:
    verifying with the UEMS that the user device is still opted in for persistent enrollment; and
    in an instance where the verification indicates that the user device is not opted in for persistent enrollment, executing a security protocol.

5. The method of claim 4, wherein the security protocol includes at least one selected from:
    uninstalling the deployment agent;
    removing all applications and data files associated with the enterprise; and
    restoring the user device to its factory settings.

6. The method of claim 4, wherein the user device is not opted in for persistent enrollment as a result of an administrator console disabling persistent enrollment of the user device.

7. The method of claim 1, wherein the booting firmware is a Basic Input/Output System ("BIOS").

8. A non-transitory, computer-readable medium containing instructions that, when executed by a hardware-based processor, performs stages for persistent enterprise device enrollment, the stages comprising:
    verifying, by a deployment agent installed in a booting firmware of a user device, that persistent enrollment is enabled for the user device during a booting process of the user device;
    pausing the booting process for an operating system ("OS") loading on the user device;
    receiving an address for an enrollment provisioning package;
    retrieving, using the address, the enrollment provisioning package, the enrollment provisioning package including a software package for a management agent; and
    installing the management agent on the user device, whereupon the management agent completes enrollment of the user device with a Unified Endpoint Management System ("UEMS") by performing stages comprising:
        configuring the user device using a staging user profile included the enrollment provisioning package;
        in response to the configuring being completed, resuming the booting process to provide a user login prompt;
        receiving user login credentials via the user login prompt;
        retrieving, using the user login credentials, a user profile associated with the user login credentials; and
        configuring the user device using policies and configuration settings included in the user profile.

9. The non-transitory, computer-readable medium of claim 8, wherein the deployment agent verifying that persistent enrollment is enabled for the user device comprises providing, to an enrollment server, a hardware identifier associated with the user device and a user identifier associated with the staging user profile, the hardware identifier and the user identifier being previously provided to the enrollment server by an administrator console.

10. The non-transitory, computer-readable medium of claim 8, wherein the management agent completing enrollment of the user device with the UEMS comprises
    changing ownership of the user device with the UEMS to a user profile associated with the log in credentials.

11. The non-transitory, computer-readable medium of claim 8, the stages further comprising:
    verifying with the UEMS that the user device is still opted in for persistent enrollment; and
    in an instance where the verification indicates that the user device is not opted in for persistent enrollment, the user device executing a security protocol.

12. The non-transitory, computer-readable medium of claim 11, wherein the security protocol includes at least one selected from:
    uninstalling the deployment agent;
    removing all applications and data files associated with the enterprise; and
    restoring the user device to its factory settings.

13. The non-transitory, computer-readable medium of claim 11, wherein the user device is not opted in for persistent enrollment as a result of an administrator console disabling persistent enrollment of the user device.

14. The method of claim 8, wherein the booting firmware is a Basic Input/Output System ("BIOS").

15. A system for persistent enterprise device enrollment, comprising:
    a memory storage including a non-transitory, computer-readable medium comprising instructions; and
    a computing device including a hardware-based processor that executes the instructions to carry out stages comprising:

verifying, by a deployment agent installed in a booting firmware of a user device, that persistent enrollment is enabled for the user device during a booting process of the user device;

pausing the booting process for an operating system ("OS") loading on the user device;

receiving an address for an enrollment provisioning package;

retrieving, using the address, the enrollment provisioning package, the enrollment provisioning package including a software package for a management agent; and installing the management agent on the user device, whereupon the management agent completes enrollment of the user device with a Unified Endpoint Management System ("UEMS") by performing stages comprising:
- configuring the user device using a staging user profile included the enrollment provisioning package;
- in response to the configuring being completed, resuming the booting process to provide a user login prompt;
- receiving user login credentials via the user login prompt;
- retrieving, using the user login credentials, a user profile associated with the user login credentials; and
- configuring the user device using policies and configuration settings included in the user profile.

16. The system of claim 15, wherein the deployment agent verifying that persistent enrollment is enabled for the user device comprises providing, to an enrollment server, a hardware identifier associated with the user device and a user identifier associated with the staging user profile, the hardware identifier and the user identifier being previously provided to the enrollment server by an administrator console.

17. The system of claim 15, wherein the management agent completing enrollment of the user device with the UEMS comprises
- changing ownership of the user device with the UEMS to a user profile associated with the log in credentials.

18. The system of claim 15, the stages further comprising:
- verifying with the UEMS that the user device is still opted in for persistent enrollment; and
- in an instance where the verification indicates that the user device is not opted in for persistent enrollment, the user device executing a security protocol.

19. The system of claim 18, wherein the security protocol includes at least one selected from:
- uninstalling the deployment agent;
- removing all applications and data files associated with the enterprise; and
- restoring the user device to its factory settings.

20. The system of claim 18, wherein the user device is not opted in for persistent enrollment as a result of an administrator console disabling persistent enrollment of the user device.

* * * * *